United States Patent
Wang et al.

(10) Patent No.: US 8,154,255 B2
(45) Date of Patent: Apr. 10, 2012

(54) SYSTEMS AND METHODS FOR WAKING UP A BATTERY SYSTEM

(75) Inventors: Ligong Wang, Round Rock, TX (US); Yung Fa Chueh, Hsichin (TW); Wen-Yung Chang, Chungli (TW); Chia-Fa Chang, Linkou Township, Taipei County (TW); Tun-Chieh Liang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 591 days.

(21) Appl. No.: 12/322,355

(22) Filed: Jan. 30, 2009

(65) Prior Publication Data
US 2010/0194348 A1 Aug. 5, 2010

(51) Int. Cl.
*H02J 7/00* (2006.01)

(52) U.S. Cl. ......................................................... 320/136

(58) Field of Classification Search .................... 320/136
See application file for complete search history.

(56) References Cited

U.S. PATENT DOCUMENTS

| | | | |
|---|---|---|---|
| 4,709,355 A | 11/1987 | Woods et al. | |
| 4,897,662 A | 1/1990 | Lee et al. | |
| 5,339,296 A | 8/1994 | Davis | |
| 5,448,110 A | 9/1995 | Tuttle et al. | |
| 5,774,876 A | 6/1998 | Woolley et al. | |
| 5,804,810 A | 9/1998 | Woolley et al. | |
| 5,892,441 A | 4/1999 | Woolley et al. | |
| 5,909,152 A | 6/1999 | Li et al. | |
| 5,955,869 A | 9/1999 | Rathmann | |
| 6,072,250 A * | 6/2000 | Thandiwe et al. | ............ 307/150 |
| 6,243,007 B1 | 6/2001 | McLaughlin et al. | |
| 6,480,104 B1 | 11/2002 | Wall et al. | |
| 6,745,027 B2 | 6/2004 | Twitchell, Jr. | |
| 6,885,952 B1 * | 4/2005 | Hayes | .............................. 702/64 |
| 6,934,540 B2 | 8/2005 | Twitchll, Jr. | |
| 6,972,677 B2 | 12/2005 | Coulthard | |
| 6,980,106 B2 | 12/2005 | Sutphin | |
| 7,072,668 B2 | 7/2006 | Chou | |
| 7,072,697 B2 | 7/2006 | Lappetelainen et al. | |
| 7,082,344 B2 | 7/2006 | Ghaffari | |
| 7,133,704 B2 | 11/2006 | Twitchell, Jr. | |
| 7,155,264 B2 | 12/2006 | Twitchell, Jr. | |
| 7,196,661 B2 | 3/2007 | Harvey | |
| 7,200,132 B2 | 4/2007 | Twitchell, Jr. | |
| 7,209,468 B2 | 4/2007 | Twitchell, Jr. | |
| 7,209,771 B2 | 4/2007 | Twitchell, Jr. | |

(Continued)

OTHER PUBLICATIONS

Wang et al, "Activating an Information Handling System Battery From a Ship Mode", U.S. Appl. No. 12/253,829, Filed Oct. 17, 2008, 27 pgs.

*Primary Examiner* — Arun Williams
(74) *Attorney, Agent, or Firm* — O'Keefe, Egan, Peterman & Enders LLP (57) ABSTRACT

Systems and methods for waking up a battery system (e.g., battery pack such as a smart battery pack) installed in an information handling system from a shipping mode in response to the occurrence of one of at least two detected events. The first of these of these at least two events is detection of the battery system being removed and reinstalled into operational electrical contact with the information handling system, and the second of these at least two events is the activation of a user input device provided for the battery system.

25 Claims, 4 Drawing Sheets

U.S. PATENT DOCUMENTS

| | | |
|---|---|---|
| 7,221,668 B2 | 5/2007 | Twitchell, Jr. |
| 7,333,015 B2 | 2/2008 | Ekstrom |
| 7,378,819 B2 | 5/2008 | Wang et al. |
| 7,391,184 B2 | 6/2008 | Luo et al. |
| 7,394,350 B2 | 7/2008 | Yoshida et al. |
| 7,430,437 B2 | 9/2008 | Twitchell, Jr. |
| 2003/0112124 A1 | 6/2003 | Gudmundsson |
| 2004/0100379 A1 | 5/2004 | Boman et al. |
| 2005/0232747 A1 | 10/2005 | Brackmann et al. |
| 2005/0283438 A1 | 12/2005 | Brownewell et al. |
| 2006/0022637 A1 | 2/2006 | Wang et al. |
| 2006/0023679 A1 | 2/2006 | Twitchell, Jr. |
| 2006/0273886 A1 | 12/2006 | Yamamoto et al. |
| 2007/0159999 A1 | 7/2007 | Twitchell, Jr. |
| 2007/0291690 A1 | 12/2007 | Twitchell, Jr. |
| 2007/0291724 A1 | 12/2007 | Twitchell, Jr. |
| 2008/0030345 A1 | 2/2008 | Austin et al. |
| 2008/0061964 A1 | 3/2008 | Yoshida et al. |
| 2008/0129458 A1 | 6/2008 | Twitchell, Jr. |
| 2008/0130536 A1 | 6/2008 | Twitchell, Jr. |
| 2008/0142592 A1 | 6/2008 | Twitchell, Jr. |
| 2008/0143483 A1 | 6/2008 | Twitchell, Jr. |
| 2008/0143484 A1 | 6/2008 | Twitchell, Jr. |
| 2008/0143523 A1 | 6/2008 | Ekstrom |
| 2008/0144554 A1 | 6/2008 | Twitchell, Jr. |
| 2008/0297116 A1* | 12/2008 | Odaohhara et al. ........... 320/137 |
| 2009/0056408 A1* | 3/2009 | Tryfonos et al. ............... 73/1.06 |

* cited by examiner

SYSTEMS AND METHODS FOR WAKING UP A BATTERY SYSTEM

FIELD OF THE INVENTION

This invention relates generally to information handling systems, and more particularly to battery systems for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems, such as notebook computers, often include rechargeable batteries in the form of battery packs for powering a system load of the information handling system. Such portable information handling systems are also typically configured to receive external power from an AC adapter for recharging the battery pack and for independently powering the system. During lengthy shutdown times, such as during storage and prior to delivery of a new system to a customer, the system shutdown current (leakage current) may totally drain the charge from a battery pack of such an information handling system. One way to avoid draining the initial charge of a battery pack is to ship a new portable information handling system with the battery pack removed from the system. However, this requires separate packaging and additional effort on the part of the customer to install the battery pack prior to use.

Smart battery packs are typically employed for notebook computers, and include intelligence in the form of a battery management unit (BMU) that is responsible for monitoring battery system operation and for controlling battery charge and discharge current from the battery pack using field effect transistor (FET) switching elements that are commonly referred to as a charge FET (C-FET) and discharge FET (D-FET). In the past, such a smart battery pack has been shipped pre-installed within a new notebook computer system with the D-FET of the battery pack disabled (i.e., in "shipping mode", in which the BMU only performs maintenance gas gauge functions so as to consume less power) in order to prevent any current leakage from the battery pack prior to delivery to a customer. In such a previous configuration, external power from an AC adapter is required to release the smart battery pack from the shipping mode condition by enabling the D-FET during the first time usage of the notebook computer. However, a customer may find such a requirement inconvenient, since the newly delivered notebook computer requires AC power and is incapable of operating on battery power for its first use.

Figure 1:
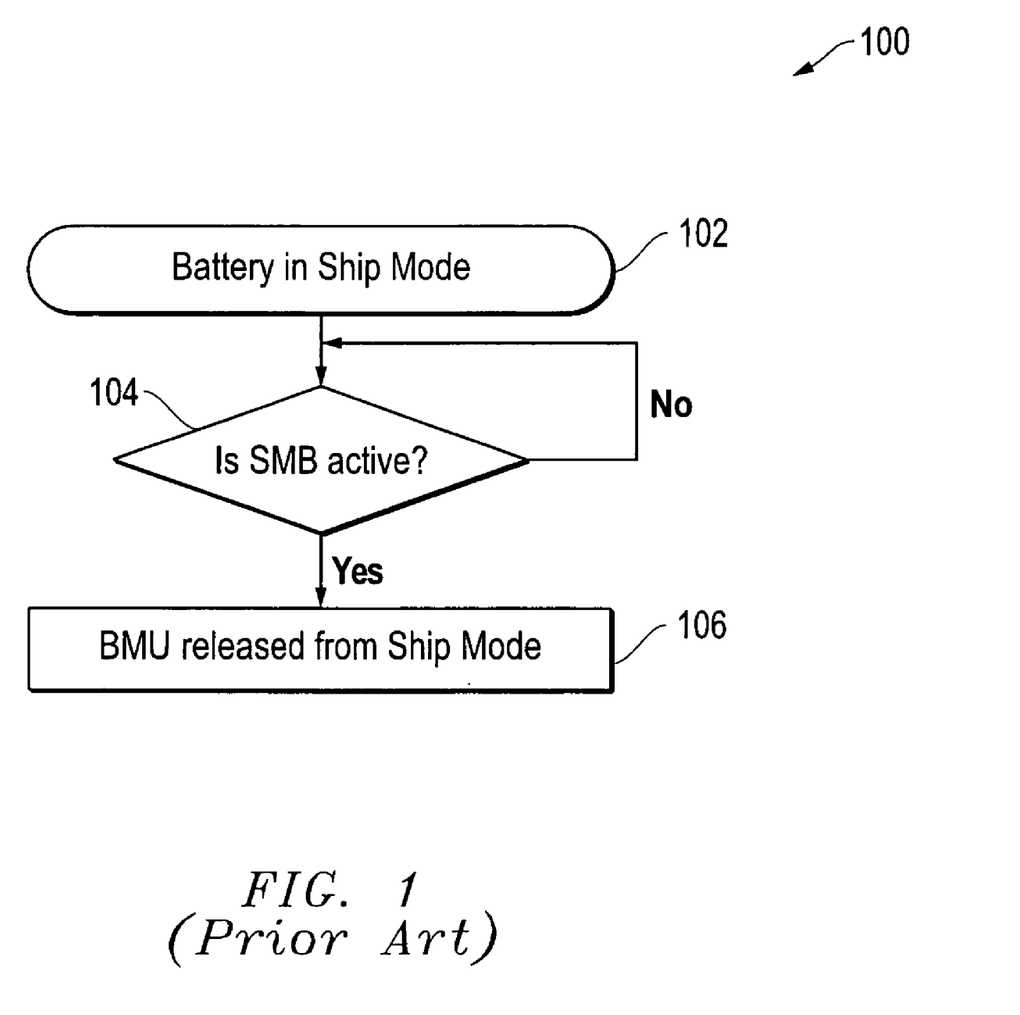
FIG. 1 illustrates methodology of the prior art.

FIG. 1 illustrates the above-described prior art methodology 100 in which an at least partially charged smart battery (e.g., about 40% to about 50% charged) starts in step 102 in shipping mode with the D-FET component/s of the battery pack disabled so as to prevent any current leakage from battery cells of the battery pack. As shown in step 104, the battery management unit (BMU) of the battery pack monitors the System Management Bus (SMBus), including clock line SMCL and data line SMDA, or other suitable data communication bus that exchanges data between the BMU and the embedded controller of the system. As long as the SMBus is not active (indicating no external power is supplied to the system from the AC adapter), the smart battery remains in shipping mode. However, once AC power is connected to the system and it is turned on, then the SMBus becomes active with a rising edge on either SMCL or SMDA line. The BMU detects that the SMBus is active and then enables the D-FET component/s of the battery pack in step 106 to release the battery pack from shipping mode.

SUMMARY OF THE INVENTION

Disclosed herein are systems and methods for waking up a battery system (e.g. a battery pack such as a smart battery pack) installed in an information handling system from a shipping mode in which the current flow from the battery system is disabled. The disclosed systems and methods may be implemented in a manner that eliminates the requirement for providing external power (e.g., from an AC adapter) to the information handling system to release the battery system from the shipping mode condition to wake up the battery system, and which may be implemented to wake up the battery system without providing a separate signal from other information handling system components to, for example, the BMU of a smart battery pack. Since a customer or end-user is enabled to power up the information handling system for the first time on battery power, and without the need for external power from an AC adapter, the probability of needing a service call to help the customer or end-user successfully power up the information handling system is lowered. Further, in one exemplary embodiment the disclosed methods may be implemented without requiring a change to the configuration of the circuitry design (including motherboard) of a pre-existing information handling system, or the circuitry design of its associated smart battery pack.

The disclosed systems and methods may be implemented to wake up a battery system in response to the detection of the occurrence of one of at least two events. The first of these at least two events is the removal and reinstallation (e.g., reinsertion) of the battery system in operational electrical contact with the information handling system. In particular, the battery system may be woke up (or activated) upon detection that the battery system has been reinstalled in operational electrical contact after being removed from operational electrical contact with other components of information handling system. The second of these at least two events that may be detected is the activation of a user input device that is integral to the battery system, e.g., by pushing a user input device such as a battery LED button. In either case the information handling system may then be powered up on battery power by activating the main power switch of the information handling system.

In one exemplary embodiment, the disclosed systems and methods may utilize the BMU of an at least partially charged and installed smart battery pack to wake up the battery pack in response to the occurrence of one of at least two events detected by the BMU. As described above, the first of these at least two events is the removal and reinstallation of the battery pack in operational electrical contact with the information handling system, e.g., such as may be detected by change in state of the system-present pin of the battery connector of the battery pack. In particular, the BMU may monitor the system-present pin to detect when the smart battery pack has been removed from electrical operational electrical contact with other components of information handling system and then reinstalled in operational electrical contact, and then wake up the smart battery pack from shipping mode upon occurrence of these sequence of events. Thus, for example, the customer or end-user of the information handling system may remove and then re-install the smart battery pack from a newly purchased information handling system to wake up the smart battery pack and enable the information handling system to operate for the first time on power supplied from the battery pack. The customer or end-user may then power up the information handling system on battery power by activating the main power switch of the information handling system.

The second of these at least two events that may be detected by the BMU to wake up the smart battery pack is the activation of a user input device (e.g., LED button or other type of switch provided integral to the battery pack for checking the charge state of the battery cells of the pack). Thus, the customer or end-user of the information handling system may activate (e.g., by pushing or otherwise physically manipulating) the user input device of the smart battery pack of a newly purchased information handling system to wake up the smart battery pack and enable the information handling system to operate for the first time on power supplied from the battery pack. Once again, the information handling system may then be powered up on battery power by activating the main power switch of the information handling system.

In one respect, disclosed herein is an information handling system, including: a system load; a battery system separate from the system load, the battery system being coupled in operational electrical contact by at least one terminal node to provide current to the system load, and the battery system including: one or more battery cells, at least one processor or controller, and battery current control circuitry to control flow of discharge current from the battery sells to the system load across the terminal node. The at least one processor or controller of the battery system may be configured to first maintain the battery current control circuitry in a shipping mode state by controlling the battery current control circuitry to prevent flow of any current from the one or more battery cells to the system load across the terminal node, and then to release the battery system from the shipping mode state by controlling the battery current control circuitry to allow flow of current from the one or more battery cells to the system load across the terminal node. The at least one processor or controller of the battery system may also be configured to release the battery system from the shipping mode state in response to at least one of the following conditions: detection of activation of a user input device of the battery system, the user input device being integrated as a part of the battery system; or detection of the removal and reinstallation of the battery system in operational electrical contact with the system load at the terminal node.

In another respect, disclosed herein is a method for waking up a battery system, including: providing an information handling system including a system load and a battery system separate from the system load, the battery system being coupled in operational electrical contact by at least one terminal node to provide current to the system load across the terminal node, and the battery system including one or more battery cells, at least one processor or controller, and battery current control circuitry to control flow of discharge current from the battery sells to the system load across the terminal node; then maintaining the battery current control circuitry in a shipping mode state by using the at least one processor or controller of the battery system to control the battery current control circuitry to prevent flow of any current from the one or more battery cells to the system load across the terminal node; and then releasing the battery system from the shipping mode state by using the at least one processor or controller of the battery system to control the battery current control circuitry to allow flow of current from the one or more battery cells to the system load across the terminal node in response to at least one of the following conditions: detection of activation of a user input device of the battery system, the user input device being integrated as a part of the battery system; or detection of the removal and reinstallation of the battery system in operational electrical contact with the system load at the terminal node.

In another respect, disclosed herein is a battery system configured to be coupled in operational electrical contact by at least one terminal node to provide current to a system load of an information handling system that is separate from the battery system, the battery system including: one or more battery cells; at least one processor or controller; and battery current control circuitry to control flow of discharge current from the battery sells to the system load across the terminal node. The at least one processor or controller of the battery system may be configured to first maintain the battery current control circuitry in a shipping mode state while the battery system is coupled in operational electrical contact to the system load by controlling the battery current control circuitry to prevent flow of any current from the one or more battery cells to the system load across the terminal node, and then to release the battery system from the shipping mode state by controlling the battery current control circuitry to allow flow of current from the one or more battery cells to the system load across the terminal node. The at least one processor or controller of the battery system may also be configured to release the battery system from the shipping mode state in response to at least one of the following conditions: detection of activation of a user input device of the battery system, the user input device being integrated as a part of the battery system; or detection of the removal and reinstallation of the battery system in operational electrical contact with the system load at the terminal node.

DESCRIPTION OF ILLUSTRATIVE EMBODIMENTS

Figure 2:
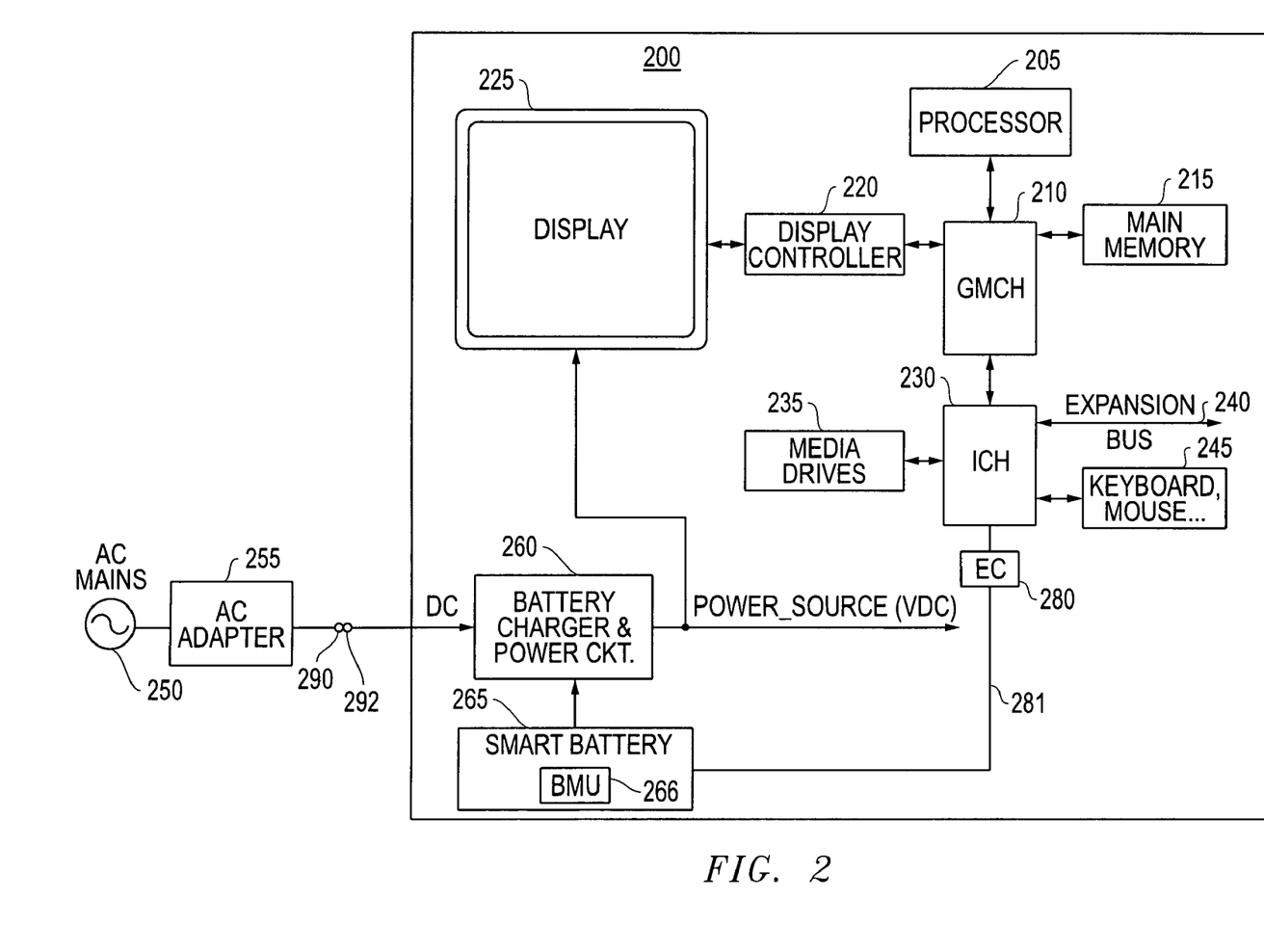
FIG. 2 is a block diagram of an information handling system as it may be configured according to one exemplary embodiment of the disclosed systems and methods.

FIG. 2 is a block diagram of an information handling system 200 (e.g., portable information handling system such as notebook computer, MP3 player, personal data assistant (PDA), cell phone, cordless phone, etc.) as it may be configured according to one exemplary embodiment of the disclosed systems and methods. As shown in FIG. 2, information handling system 200 of this exemplary embodiment includes a processor 205 such as an Intel Pentium series processor, an Advanced Micro Devices (AMD) processor or one of many other processors currently available. A graphics/memory controller hub (GMCH) chip 210 is coupled to processor 205 to facilitate memory and display functions. System memory 215 and a display controller 220 are coupled to GMCH 210. A display 225 may be coupled to display controller 220 to provide visual images to the user. An I/O controller hub (ICH) chip 230 is coupled to GMCH chip 210 to facilitate input/output functions for the information handling system. Media drives 235 are coupled to ICH chip 230 to provide permanent storage to the information handling system. An expansion bus 240 is coupled to ICH chip 230 to provide the information handling system with additional plug-in functionality. Expansion bus 240 may be a PCI bus, PCI Express bus, SATA bus, USB or virtually any other expansion bus. Input devices 245 such as a keyboard and mouse are coupled to ICH chip 230 to enable the user to interact with the information handling system. An embedded controller (EC) 280 running system BIOS is also coupled to ICH chip 230.

In this particular embodiment, information handling system 200 is coupled to an external source of AC power, namely AC mains 250 and AC adapter 255. As shown AC adapter 255 is removably coupled to, and separable from, battery charger/power circuit 260 of information handling system 200 at mating interconnection terminals 290 and 292 in order to provide information handling system 200 with a source of DC power to supplement DC power provided by battery cells of smart battery pack 265, e.g., lithium ion ("Li-ion") or nickel metal hydride ("NiMH") battery pack including one or more rechargeable batteries and a BMU that includes an analog front end ("AFE") and microcontroller. Further, a battery system data bus (SMBus) 281 is coupled to smart battery pack 265 to provide battery state information, such as battery voltage and current information, from BMU 266 of smart battery pack 265 to EC 280.

Figure 3:
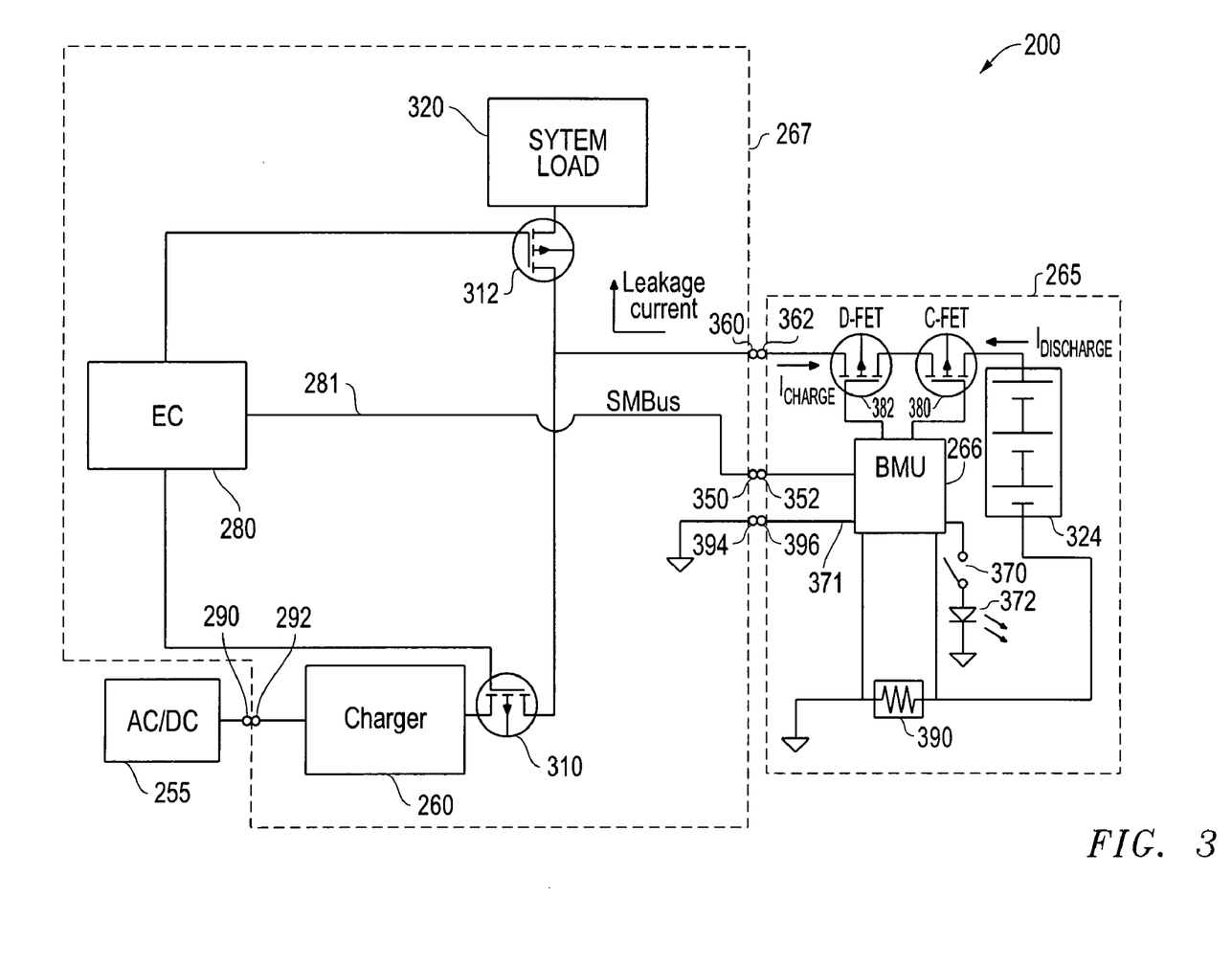
FIG. 3 is a block diagram showing a smart battery pack removably coupled to other system components of an information handling system according to one exemplary embodiment of the disclosed systems and methods.

As shown in for the exemplary embodiment of FIG. 3, smart battery pack 265 may be removably coupled to, and is separable from, other system components 267 of information handling system 200 at a terminal node by engagement of system side electrical power terminals 360 with battery pack side electrical power terminals 362 (operational electrical contact). In this regard, smart battery pack 265 may include one or more battery cell/s 324 coupled to electrical power terminals 362 that are configured to be removably coupled to system side electrical power terminals 360 so that terminals 360 contact terminals 362 to allow current to be interchanged between smart battery pack 265 and other system components 267 of information handling system 200. Battery cell/s 324 may be any type of rechargeable battery cell/s or combination thereof that is suitable for recharging. Examples of such battery cells include, but are not limited to, Li-ion battery cells, NiMH battery cells, nickel cadmium (NiCd) battery cells, lithium-polymer (Li-polymer) battery cells, etc.

Battery pack 265 also includes SMBus terminals 352 that are configured to removably coupled to system side SMBus terminals 350 to allow data to be interchanged between smart battery pack 265 and EC 280. It will be understood that functions of EC 280 may alternatively be performed by a keyboard controller in other embodiments. Also shown in FIG. 3 are switching elements 310 and 312 which are each controlled by EC 280, and which may be present to regulate current flow from charger 260 and to regulate current flow to system load 320, respectively. In this regard, system load 320 may comprise system components such as display 225, processor 205, media drives 235, etc. of FIG. 2, and/or may include additional, fewer or alternative system components that draw current. It will be understood that any other number and/or type of switching elements suitable for controlling current flow between charger 260, system load 320 and/or battery pack 265 may be present. Examples of types of suitable switching elements include, but are not limited to, bipolar junction transistors (BJTs) and field effect transistors (FETs).

Smart battery pack 265 is also shown provided with battery current control circuitry to control flow of charge current to battery cell/s 324 of battery pack 265, and to also control flow of discharge current from battery cell/s 324 of battery pack 265. In this exemplary embodiment, the charge and discharge circuitry includes two field effect transistors ("FETs") 380 and 382 coupled in series between battery charge terminal 362 and battery cell/s 324. FET 380 is a charge FET switching element that forms a part of a charge circuit that is controlled by components (e.g., microcontroller and/or AFE) of BMU 266 to allow or disallow charge current to the battery cell/s 324, and FET 382 is a discharge FET switching element that forms a part of discharge circuit that is controlled by components (e.g., microcontroller and/or AFE) of BMU 266 to allow or disallow discharge current from the battery cell/s 324. Body diodes may be present across the source and drain of each FET switching element, i.e., to conduct charge current to the battery cell/s when the discharge FET switching element 382 is open, and to conduct discharge current from the battery cell/s when the charge FET switching element 380 is open. It will be understood that battery current control circuitry of battery pack 265 may include any other number and/or type of charge and discharge switching elements suitable for performing the current control tasks described herein. Examples of types of suitable switching elements include, but are not limited to, bipolar junction transistors (BJTs) and field effect transistors (FETs).

Also shown in the exemplary embodiment of FIG. 3 is a user input device in the form of a switch 370 is integral to battery pack 265 (e.g., LED button located on the LED label of the battery pack), which may also be present, for example, to allow a user to check the charge state (i.e., percentage charge) of the battery cell/s 324 of battery pack 265 using light emitting diode (LED) 372. In this regard, an integral user input device may be positioned on an external surface of battery pack 265 to allow a user to access the user input device and activate it by physical manipulation, e.g., depressing the LED button with a user's a finger to close the switch 370. It will be understood that an integral user input device may take the form of any type of switch or other circuitry suitable for allowing a user to activate charge indication or other circuitry within battery pack 265, or may be present only to initiate battery system wakeup operations as described elsewhere herein.

During normal battery pack operations both charge and discharge FET switching elements 380 and 382 are placed in the closed state by BMU 266, which also monitors voltage of battery cell/s 324. If BMU 266 detects a battery over-voltage condition, BMU 266 opens the charge FET switching element 380 to prevent further charging of the battery cell/s until the over-voltage condition is no longer present. Similarly, if BMU 266 detects a battery under-voltage (or over-discharge) condition, BMU 266 opens the discharge FET switching element 382 to prevent further discharging of the battery cell/s until the under-voltage condition is no longer present. BMU 266 may also open the charge FET switching element 214 when the battery pack is in sleep mode. A current sense resistor 390 is present in the battery pack circuitry to allow BMU 266 to monitor charge current to the battery cell/s. Further information on BMU, battery pack and battery charging operations may be found in U.S. Pat. No. 7,378,819, U.S. Pat. No. 7,391,184, and U.S. patent application Ser. No. 12/253,829 filed Oct. 17, 2008, each of which is incorporated herein by reference in its entirety.

Still referring to FIG. 3, battery pack 265 may be installed in at least partially charged state into information handling system 200 and placed in "shipping mode", e.g., when a newly assembled information handling system 200 is shipped to a customer or end user. In the shipping mode, BMU 266 maintains D-FET 382 of battery pack 265 in an open or disabled condition in order to prevent any current leakage from the battery pack to other components of information handling system 200 during shipping (e.g., shipping from a first geographic location to a second and different geographic location) and prior to delivery to the customer or end user. While battery pack 265 is in shipping mode, the controller of BMU 266 remains active and powered by battery cells 324 of battery pack 265. Since it remains active, BMU 266 is able to monitor the status of user input device 370 (e.g., LED button) of battery pack 265, and/or monitor the status of system-present pin 371 of battery connector, the state of which will change when battery pack 265 is removed from operational electrical contact and then reinstalled (e.g., reinserted) into operational electrical contact with other components 267 of information handling system 200. As shown in the exemplary embodiment of FIG. 3, system present pin 371 of BMU 266 is grounded on the system side via interconnection terminals 394, 396 when battery pack 265 is installed in operational electrical contact with other components 267 of information handling system 200, and is ungrounded when battery pack 265 is removed from operational electrical contact with other components 267 of information handling system 200. Thus, BMU 266 detects and determines when battery pack 265 is so installed or removed by monitoring the status (e.g., grounded versus ungrounded) of system-present pin 371. However, it will be understood that any other suitable circuitry and/or methodology may be employed for monitoring when a battery system is installed in operational electrical contact with an information handling system.

It will be understood that the functions of BMU 266 described herein may be implemented using any circuitry and/or control logic configuration suitable for performing the tasks thereof. For example, in one embodiment, one or more features of BMU 266 may be implemented using a controller (e.g., processor and associated firmware) that is integral to battery pack 265 or using any other suitable configuration of microcontroller/microprocessor, firmware and/or software that interfaces with battery pack circuitry/components. Furthermore, it will be understood that the herein-described tasks of BMU 266 may be performed by a single integrated component or by two or more separate components. In addition, it will be understood that removal and reinstallation of a battery pack 265 in operational electrical contact with other components 267 of the information handling system may be monitored using any other alternative circuitry configuration to system-present pin 371 that is suitable for indication thereof.

Figure 4:
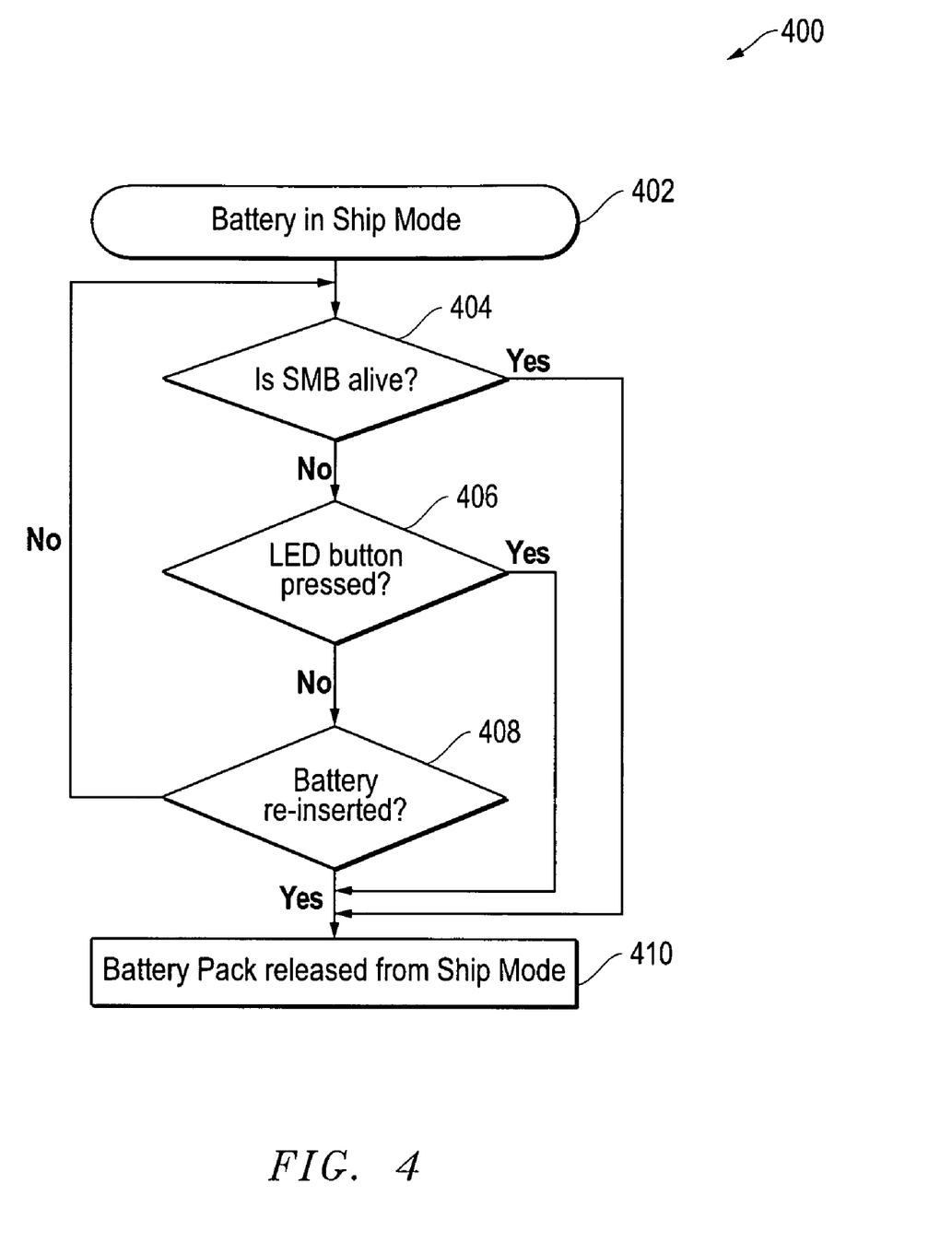
FIG. 4 illustrates methodology according to one exemplary embodiment of the disclosed systems and methods.

FIG. 4 illustrates one exemplary embodiment of the methodology 400 that may be implemented to wake up an at least partially charged battery pack (e.g., such as smart battery pack 265 of FIGS. 2 and 3) of an information handling system from shipping mode. Methodology 400 may be implemented, for example, as firmware or other computer program of instructions embodied in a tangible computer readable medium that is executed by a microcontroller or other suitable processing device inside the battery pack to perform the steps thereof, e.g., using a microcontroller inside BMU 266 of battery pack 265 of information handling system 200 of FIGS. 2 and 3. In this regard, methodology 400 will be described below in reference to information system 200 of FIGS. 2 and 3, it being understood that the methodology may be implemented with any other alternative configuration of information handling system components that are suitable for implementation therewith.

As shown, methodology 400 starts with step 402 in which D-FET 382 of battery pack 265 has been disabled or otherwise controlled by BMU 266 to prevent leakage of current form battery cell/s 324 of battery pack 265 to other system components 267 of information handling system 200. Step 402 may be performed to set battery pack 265 into shipping mode, for example, at time of fabrication or assembly of information handling system 200 into which battery pack 265 is installed, or at any other suitable time prior to shipping of the information handling system 200 to a customer or end user of the information handling system. D-FET 382 may be so disabled, for example, by opening D-FET 382 such that it does not conduct any current.

As shown, methodology 400 includes step 404 in which SMBus 281 is monitored by BMU 266 for system activity. When information handling system is powered up using power from an external power supply, such as AC adapter 255, then SMBus 281 will become active and BMU 266 will detect this activity. Methodology 400 will then proceed to step 410 where BMU 266 releases battery pack 265 from shipping mode, e.g., by closing or otherwise controlling D-FET 382 to allow discharge current to flow across terminals 362, 360 from battery cell/s 324 of battery pack 265 to other system components 267 of information handling system 200. However, if no external power is supplied to information handling system, methodology 400 proceeds to step 406 where BMU 266 monitors user input device 370, in this exemplary embodiment a LED button, to determine if it has been activated by a user. If so, then methodology 400 proceeds to step 410 where BMU 266 releases battery pack 265 from shipping mode. However, if user input device 370 has not been activated by a user, then methodology 400 proceeds to step 408 where BMU 266 monitors the current status of the system-present pin 371 to determine if battery pack 265 has been removed from and then reinstalled into operational electrical contact with information handling system 200 (i.e., "operational electrical contact" meaning terminals 360 and 362 make electrical contact for the embodiment of FIG. 3). If so, then methodology 400 proceeds to step 410 where BMU 266 releases battery pack 265 from shipping mode. However, if the current status of system-present pin 371 indicates that battery pack 265 has not been removed and reinstalled into operational electrical contact with information handling system 200 then methodology 400 returns to step 404 as shown in FIG. 4, and then iteratively repeats in similar fashion until the results of one of the three steps BMU 266 is the release of battery pack 265 from shipping mode.

It will be understood that the particular order and number of steps illustrated and described in relation to FIG. 4 is exemplary only, and that a fewer number of steps may be employed, e.g., steps 402, 404 and 410 may be employed in combination with either one of steps 406 or 408 alone, steps 402 and 410 may be employed in combination with steps 406 and 408 only and without step 404, or steps 402 and 410 may be employed with either one of steps 406 or 408 alone. Further, the illustrated order of steps 404, 406 and 408 of methodology 400 is exemplary only and may be performed in any other sequence. In any case, once BMU 266 releases battery pack 265 from shipping mode in step 410, then the user is enabled to power up the information handling system on battery power by activating the main power switch of the system, and without requiring external power supplied from AC adapter 255.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   a system load;
   a battery system separate from said system load, said battery system being coupled in operational electrical contact by at least one terminal node to provide current to said system load, and said battery system comprising:
     one or more battery cells,
     at least one processor or controller, and
     battery current control circuitry to control flow of discharge current from said battery sells to said system load across said terminal node;
   wherein said at least one processor or controller of said battery system is configured to first maintain said battery current control circuitry in a shipping mode state by controlling said battery current control circuitry to prevent flow of any current from said one or more battery cells to said system load across said terminal node, and then to release said battery system from said shipping mode state by controlling said battery current control circuitry to allow flow of current from said one or more battery cells to said system load across said terminal node; and
   wherein said at least one processor or controller of said battery system is configured to remain active and powered by the battery cells of the battery system while the battery system is maintained in the shipping mode state, and where the at least one processor or controller of said battery system is configured to release said battery system from said shipping mode state in response to at least one of the following conditions:
     detection of activation of a user input device of said battery system, said user input device being integrated as a part of said battery system; or
     detection of the removal and reinstallation of the battery system in operational electrical contact with said system load at said terminal node.

2. The system of claim 1, wherein said at least one processor or controller of said battery system is configured to release said battery system from said shipping mode state in response to detection of activation of a user input device of said battery system, said user input device being integrated as a part of said battery system.

3. The system of claim 2, wherein said battery system is a smart battery pack; and wherein said user input device comprises an LED button provided on an external surface of said smart battery pack so as to be accessible to a user of said information handling system.

4. The system of claim 1, wherein said at least one processor or controller of said battery system is configured to release said battery system from said shipping mode state in response to detection of the removal and reinstallation of the battery system in operational electrical contact with said system load at said terminal node.

5. The system of claim 4, wherein said battery system further comprises a system-present pin, a status of said system-present pin being indicative of whether or not said battery system is in operational electrical contact with said system load at said terminal node; and wherein said at least one processor or controller of said battery system is configured to monitor a status of said system-present pin and to release said battery system from said shipping mode state in response to detection of a state of said system present pin that indicates that the battery system has been removed from and then reinstalled in operational electrical contact with said system load at said terminal node.

6. The system of claim 1, wherein said at least one processor or controller of said battery system is configured to release said battery system from said shipping mode state at the same time that no external power is supplied to said information handling system.

7. The system of claim 1, wherein said at least one processor or controller of said battery system is communicatively coupled by a communication bus to at least one other component of said information handling system that is separate from said battery system; and wherein said at least one processor or controller of said battery system is configured to release said battery system from said shipping mode state in response to any one of the three following conditions:
   detection of activation of a user input device of said battery system, said user input device being integrated as a part of said battery system; or
   detection of the removal and reinstallation of the battery system in operational electrical contact with said system load at said terminal node; or
   detection of data activity on said communication bus.

8. The system of claim 1, wherein said information handling system is a notebook computer, wherein said battery system is a smart battery pack, and wherein said at least one processor or controller of said battery system is a battery management unit (BMU).

9. A method for waking up a battery system, comprising:
   providing an information handling system including a system load and a battery system separate from said system load, said battery system being coupled in operational electrical contact by at least one terminal node to provide current to said system load across said terminal node, and said battery system comprising one or more battery cells, at least one processor or controller, and battery current control circuitry to control flow of discharge current from said battery sells to said system load across said terminal node;

then maintaining said battery current control circuitry in a shipping mode state by using said at least one processor or controller of said battery system to control said battery current control circuitry to prevent flow of any current from said one or more battery cells to said system load across said terminal node while at the same time powering said at least one processor or controller of said battery system with the battery cells of the battery system to maintain the at least one processor or controller of said battery system in an active state while the battery system is maintained in the shipping mode state; and then releasing said battery system from said shipping mode state by using said at least one processor or controller of said battery system to control said battery current control circuitry to allow flow of current from said one or more battery cells to said system load across said terminal node in response to at least one of the following conditions:

detection of activation of a user input device of said battery system, said user input device being integrated as a part of said battery system; or     detection of the removal and reinstallation of the battery system in operational electrical contact with said system load at said terminal node.

10. The method of claim 9, comprising using said at least one processor or controller of said battery system to control said battery current control circuitry to allow flow of current from said one or more battery cells to said system load across said terminal node in response to detection of activation of a user input device of said battery system, said user input device being integrated as a part of said battery system.

11. The method of claim 10, wherein said battery system is a smart battery pack; and wherein said user input device comprises an LED button provided on an external surface of said smart battery pack so as to be accessible to a user of said information handling system.

12. The method of claim 9, comprising using said at least one processor or controller of said battery system to control said battery current control circuitry to allow flow of current from said one or more battery cells to said system load across said terminal node in response to detection of the removal and reinstallation of the battery system in operational electrical contact with said system load at said terminal node.

13. The method of claim 12, wherein said battery system further comprises a system-present pin, a status of said system-present pin being indicative of whether or not said battery system is in operational electrical contact with said system load at said terminal node; and wherein said method further comprises using said at least one processor or controller of said battery system to monitor a state of said system-present pin and to release said battery system from said shipping mode state in response to detection of a state of said system present pin that indicates that the battery system has been removed from and then reinstalled in operational electrical contact with said system load at said terminal node.

14. The method of claim 9, wherein said method further comprises using said at least one processor or controller of said battery system to release said battery system from said shipping mode state at the same time that no external power is supplied to said information handling system.

15. The method of claim 9, wherein said at least one processor or controller of said battery system is communicatively coupled by a communication bus to at least one other component of said information handling system that is separate from said battery system; and wherein said method further comprises using said at least one processor or controller of said battery system to release said battery system from said shipping mode state in response to any one of the three following conditions:

detection of activation of a user input device of said battery system, said user input device being integrated as a part of said battery system; or     detection of the removal and reinstallation of the battery system in operational electrical contact with said system load at said terminal node; or     detection of data activity on said communication bus.

16. The method of claim 9, wherein said information handling system is a notebook computer, wherein said battery system is a smart battery pack, and wherein said at least one processor or controller of said battery system is a battery management unit (BMU).

17. The method of claim 9, further comprising providing said information handling system at a first location;

then shipping said information handling system from said first location to a second location, and maintaining said battery current control circuitry in a shipping mode state during said shipping of said information handling system from said first location to said second location; and then releasing said battery system from said shipping mode state at said second location.

18. A battery system configured to be coupled in operational electrical contact by at least one terminal node to provide current to a system load of an information handling system that is separate from said battery system, said battery system comprising:

one or more battery cells;

at least one processor or controller; and battery current control circuitry to control flow of discharge current from said battery sells to said system load across said terminal node;

wherein said at least one processor or controller of said battery system is configured to first maintain said battery current control circuitry in a shipping mode state while said battery system is coupled in operational electrical contact to said system load by controlling said battery current control circuitry to prevent flow of any current from said one or more battery cells to said system load across said terminal node, and then to release said battery system from said shipping mode state by controlling said battery current control circuitry to allow flow of current from said one or more battery cells to said system load across said terminal node; and     wherein said at least one processor or controller of said battery system is configured to remain active and powered by the battery cells of the battery system while the battery system is maintained in the shipping mode state, and where the at least one processor or controller of said battery system is configured to release said battery system from said shipping mode state in response to at least one of the following conditions:

detection of activation of a user input device of said battery system, said user input device being integrated as a part of said battery system; or detection of the removal and reinstallation of the battery system in operational electrical contact with said system load at said terminal node.

19. The battery system of claim 18, wherein said at least one processor or controller of said battery system is configured to release said battery system from said shipping mode state in response to detection of activation of a user input device of said battery system, said user input device being integrated as a part of said battery system.

20. The system of claim 18, wherein said at least one processor or controller of said battery system is configured to release said battery system from said shipping mode state in response to detection of the removal and reinstallation of the battery system in operational electrical contact with said system load at said terminal node.

21. The system of claim 18, wherein said at least one processor or controller of said battery system is configured to release said battery system from said shipping mode state at the same time that no external power is supplied to said information handling system.

22. The system of claim 18, wherein said battery system is a smart battery pack, and wherein said at least one processor or controller of said battery system is a battery management unit (BMU).

23. The system of claim 5, where the system present pin is grounded when the battery system is installed in operational electrical contact with the system load at said terminal node; where the system present pin is ungrounded when the battery system is removed from operational electrical contact with the system load at said terminal node; and where said at least one processor or controller of said battery system is configured to monitor the grounded status and ungrounded status of the system present pin to detect that the battery system has been removed from and then reinstalled in operational electrical contact with said system load at said terminal node.

24. The method of claim 13, where the system present pin is grounded when the battery system is installed in operational electrical contact with the system load at said terminal node; where the system present pin is ungrounded when the battery system is removed from operational electrical contact with the system load at said terminal node; and wherein said method further comprises using said at least one processor or controller of said battery system to monitor the grounded status and ungrounded status of the system present pin to detect that the battery system has been removed from and then reinstalled in operational electrical contact with said system load at said terminal node.

25. The system of claim 20, further comprising a system-present pin, a status of said system-present pin being configured to indicate whether or not said battery system is in operational electrical contact with said system load at said terminal node; wherein said at least one processor or controller of said battery system is configured to monitor a status of said system-present pin and to release said battery system from said shipping mode state in response to detection of a state of said system present pin that indicates that the battery system has been removed from and then reinstalled in operational electrical contact with said system load at said terminal node; where the system present pin is configured to be grounded when the battery system is installed in operational electrical contact with the system load at said terminal node; where the system present pin is configured to be ungrounded when the battery system is removed from operational electrical contact with the system load at said terminal node; and where said at least one processor or controller of said battery system is configured to monitor the grounded status and ungrounded status of the system present pin to detect that the battery system has been removed from and then reinstalled in operational electrical contact with said system load at said terminal node.

* * * * *